(12) United States Patent
Heydecke

(10) Patent No.: US 9,669,361 B2
(45) Date of Patent: Jun. 6, 2017

(54) MEMBRANE ELECTROLYSIS STACK, ELECTRODIALYSIS DEVICE INCLUDING THE STACK AND METHOD FOR THE REGENERATION OF AN ELECTROLESS PLATING BATH

(75) Inventor: Jens Heydecke, Teltow (DE)

(73) Assignee: ATOTECH DEUTSCHLAND GMBH, Berlin (DE)

( * ) Notice: Subject to any disclaimer, the term of this patent is extended or adjusted under 35 U.S.C. 154(b) by 1011 days.

(21) Appl. No.: 13/576,028

(22) PCT Filed: Apr. 13, 2011

(86) PCT No.: PCT/EP2011/055832
§ 371 (c)(1),
(2), (4) Date: Jul. 30, 2012

(87) PCT Pub. No.: WO2011/128376
PCT Pub. Date: Oct. 20, 2011

(65) Prior Publication Data
US 2012/0298509 A1    Nov. 29, 2012

(30) Foreign Application Priority Data
Apr. 16, 2010   (DE) .................. 10 2010 015 361

(51) Int. Cl.
*B01D 61/44* (2006.01)
*C23C 18/16* (2006.01)
*C25D 21/18* (2006.01)
*C02F 1/469* (2006.01)

(52) U.S. Cl.
CPC .......... *B01D 61/445* (2013.01); *B01D 61/44* (2013.01); *C23C 18/1617* (2013.01); *C25D 21/18* (2013.01)

(58) Field of Classification Search
CPC .. C23C 18/1617; B01D 61/422; B01D 61/42; B01D 61/46
See application file for complete search history.

(56) References Cited

U.S. PATENT DOCUMENTS

| | | | |
|---|---|---|---|
| 4,549,946 A | 10/1985 | Horn | |
| 5,091,070 A | 2/1992 | Bauer et al. | |
| 5,250,159 A | 10/1993 | Butterworth | |
| 5,419,821 A | 5/1995 | Vaughan | |
| 5,567,293 A * | 10/1996 | Paleologou et al. | .......... 204/523 |
| 5,645,703 A * | 7/1997 | Tsai | ..................... B01D 61/445 |
| | | | 204/537 |
| 6,221,225 B1 | 4/2001 | Mani | |
| 6,294,066 B1 | 9/2001 | Mani | |
| 6,379,517 B1 * | 4/2002 | Heydecke | ........... C23C 18/1617 |
| | | | 204/522 |
| 7,662,266 B2 | 2/2010 | Heydecke et al. | |
| 2002/0130037 A1 | 9/2002 | Hadley | |
| 2005/0014720 A1* | 1/2005 | Vila Pahi | ................. C07H 5/06 |
| | | | 514/62 |

FOREIGN PATENT DOCUMENTS

| | | |
|---|---|---|
| DE | 4310366 C1 | 10/1994 |
| DE | 102004002778 A1 | 8/2005 |
| EP | 0416312 A2 | 3/1991 |
| EP | 1006213 A2 | 7/2000 |
| EP | 1123424 | 8/2001 |
| EP | 1532295 | 5/2005 |
| JP | H07-148420 A | 6/1995 |
| JP | 2002322564 A | 11/2002 |

OTHER PUBLICATIONS

Japanese Patent Office, Japanese Patent Application 2013-504261, Examiner's Action, Nov. 11, 2014, and English translation.

* cited by examiner

*Primary Examiner* — Steven A. Friday
(74) *Attorney, Agent, or Firm* — Paul & Paul

(57) ABSTRACT

To prevent biological fouling in an electrodialysis device, an electrodialysis device including a membrane electrolysis stack are created. Every membrane electrolysis stack comprises membranes stacked on top of each other and respectively dilute and concentrate compartments arranged therebetween, at least one first and at least one second membrane alternating in succession in the membrane electrolysis stack. At least one first membrane is selected from a group comprising an anion exchange membrane and a bipolar membrane, and at least one second membrane is selected from a group comprising a monoselective anion exchange membrane, a monoselective cation exchange membrane and a proton-selective exchange membrane, with the proviso that the second membranes are respectively selected independently of each other and that at least one first membrane in the membrane electrolysis stack is a bipolar membrane.

28 Claims, 2 Drawing Sheets

MEMBRANE ELECTROLYSIS STACK, ELECTRODIALYSIS DEVICE INCLUDING THE STACK AND METHOD FOR THE REGENERATION OF AN ELECTROLESS PLATING BATH

BACKGROUND OF THE INVENTION (a) Field of the Invention

The present invention relates to a membrane electrolysis stack, an electrodialysis device including at least one such membrane electrolysis stack, and a method for the regeneration of an electroless plating bath in which such an electrodialysis device is employed for regeneration.

(b) Brief Description of the Prior Art

Electroless metal plating baths, for example electroless nickel plating baths, contain reducing agents, for example hypophosphite, to deposit the metal on the surfaces to be metallized. The reducing agent is oxidized during the deposition and is no longer available for the rest of the metal plating process. In the case of electroless nickel plating baths operated by means of hypophosphite, orthophosphite is formed in this way from hypophosphite. Furthermore, the counter-ions of the metal salts used for this are additionally introduced into the bath during the replenishment of the metal consumed during the metal plating. In the case of a nickel plating bath, sulfate anions are supplied to the bath, for example. Like the oxidation products of the reducing agent, these ions accumulate in the bath and interfere with the rest of the metal plating process. The service life of an electroless plating bath is due to the accumulation of these reaction products thus normally limited. To extend the service life of such baths, many suggestions have been made.

To this end, for example, electrodialysis devices are known which have at least one anode and at least one cathode as well as a respective membrane electrolysis stack arranged between an anode and a cathode. Each membrane electrolysis stack comprises membranes stacked on top of each other and respective electrolyte compartments arranged therebetween. The membranes comprise first and second membranes in alternate succession in the membrane electrolysis stack. Additionally, methods for the regeneration of an electroless metal plating bath are known in which the bath is transported into diluate compartments of an electrolysis device which has at least one anode, at least one cathode and at least one membrane electrolysis stack, and is freed therein from interfering ions present in the bath by transferring the interfering ions by means of electrodialysis from the diluate compartments to concentrate compartments likewise present in the electrodialysis device.

For example, a method for the regeneration of aqueous, electroless plating baths for the deposition of metal by means of metal ions and by means of a reducing agent is known from DE 43 10 366 C1, in which the plating bath to be regenerated contains Cu, Ni, Ag or Au metal ions, consumed and optionally unconsumed hypophosphite as the reducing agent, the counter-ions respectively required for this and optionally further components, the plating bath is directed into one or more electrodialysis cells equipped with cation and anion exchange membranes and its anode compartment is limited by a cation exchange membrane, consumed and unconsumed hypophosphite is further removed from the plating bath via an anion exchange membrane by electrodialysis and directed into the cathode compartment, consumed hypophosphite is further regenerated in the cathode compartment by reduction and regenerated and unconsumed hypophosphite is finally removed from the cathode compartment and supplied to the plating bath via an anion exchange membrane by electrodialysis.

Furthermore, a method for the regeneration of a process solution is known from EP 1 006 213 A2, the process solution being used in the chemical reductive deposition of metal layers and containing hypophosphite and orthophosphite, in which method the process solution is filled into an electrodialysis cell with at least four compartments, the electrodialysis cell having an anode with an anode compartment, a cathode with a cathode compartment and two more compartments separated by an anion exchange membrane and arranged between the anode compartment and the cathode compartment, a first compartment of these being separated from the cathode compartment by an anion exchange membrane while a second compartment is separated from the anode compartment by a cation exchange membrane, the process solution is filled into the first compartment when performing the method whereby the hypophosphite ions and orthophosphite ions contained therein are electrodialytically transported into the second compartment and at the same time hypophosphite ions are transported from the cathode compartment into the process solution, and regenerated process solution is extracted and supplied to another use, wherein the acid mixture formed in the second compartment by the influx of protons from the anode compartment is supplied to the weakly alkaline anion exchanger present in the hypophosphite load, the outlet of which being connected to the cathode compartment.

Furthermore, DE 10 2004 002 778 B4 discloses a method for the regeneration of electrolyte baths used for electroless metallization. According to this, at least a partial flow of the electrolyte is initially drained from the process container, the drained electrolyte flow is then regenerated and the regenerated electrolyte flow is finally recycled into the process container. The drained partial flow is supplied to a dialysis and/or electrodialysis unit for regeneration in which the anions released in the electroless metallization process are exchanged via an anion-selective membrane. Furthermore, a solution containing alkaline and/or alkaline earth hydroxide is employed as a counter solution for the dialysis and/or electrodialysis of the electrolyte. Components consumed in the metallization process are added to the electrolyte prior to the recycling into the process container. The alkaline and/or alkaline earth hydroxide solution employed in the dialysis and/or electrodialysis process is regenerated after the dialysis process.

A method for the regeneration of an electroless nickel plating bath is known from U.S. Pat. No. 5,419,821 A, in which anions of the bath within an electrodialysis device are transferred via an anion exchange membrane into a compartment within the device by electrodialysis into which protons are transferred from an anode compartment through a cation exchange membrane. The compartment including the bath is also separated from the cathode compartment by another anion exchange membrane.

A method for the electrodialytic regeneration of an electroless metal plating bath containing hypophosphite ions as the reducing agent is specified in EP 1 123 424 B1, in which the liquid of the bath is directed through diluate compartments in a first electrodialysis device having cathodes and anodes wherein these diluate compartments are separated from concentrate compartments in this electrodialysis device on the cathode side by monoselective cation exchange membranes and on the anode side by anion exchange membranes, wherein the diluate compartments and the concentrate compartments are arranged alternately with regard to each other and the bath liquid is simultaneously directed through diluate compartments in a second electodialysis device having cathodes and anodes, the diluate compartments being separated from concentrate compartments in the second electrodialysis device on the cathode side by monoselective anion exchange membranes and on the anode side by anion exchange membranes, the diluate compartments and the concentrate compartments in the second electrodialysis device being arranged alternately with regard to each other.

A method for the regeneration of an electroless metal plating bath is likewise specified in EP 1 532 295 B1 comprising the following method steps: a) directing the metal plating bath through respective diluate compartments of electrodialysis devices, b) directing a concentrate liquid serving for the removal of interfering substances to be removed from the metal plating bath through respective concentrate compartments of the electrodialysis devices, these concentrate compartments being separated from the diluate compartments by ion exchange membranes, and c) directing the concentrate liquid also through main cation exchangers and back into the concentrate compartments by enabling the concentrate liquid to circulate in a first circuit between the concentrate compartments and collection containers and in a second circuit between the collection containers and the main cation exchangers.

At least with the methods mentioned last, the orthophosphite ions and sulfate ions as well as further interfering cations, such as sodium ions, generated during the metal plating can be removed from the metal plating bath while the recyclable substances, for example the hypophosphite ions, carboxylic anions and nickel ions, remain in the bath.

EP 0 416 312 A2 teaches a method of continuously removing and obtaining ethylene diamine tetraacetic acid (EDTA) from the process water of electroless copper plating. For that purpose the process water containing the EDTA is directed into an electrodialysis cell alternatingly equipped with bipolar membranes and anion exchange membranes and/or cation exchange membranes, and to which a potential difference is applied. The EDTA is converted into its charge-neutral form by means of protonation, and the protons required for that purpose are generated via bipolar membranes through electrodialysis. The required pH-value is adjusted by a pH-controlled electric field regulation via the bipolar membranes.

Further, U.S. Pat. No. 6,294,066 B1 teaches an apparatus and a process for the electrodialysis of salts. The basic electrodialysis apparatus is a cell having a number of compartments separated by membranes. A DC source is connected to drive a current through a feed stream passing through the cell which splits the salt stream into an acid and a base. The electrodialysis cell comprises in a first embodiment a stack of bipolar and anion membranes, in a second embodiment a stack of bipolar and cation membranes and in a third embodiment a stack of bipolar, anion and cation membranes.

However, it has been found that problems often occur in the electrodialysis devices due to biological fouling as the bath liquid contains components in substantial amounts allowing for the existence of microorganisms, for example organic carboxylic acids. The biofilms generated in the course of this consist of microorganisms, such as fungi and bacteria. These films cause hydraulic and electric resistances in the devices, i.e. they clog the electrolyte compartments and the inlets and outlets and lead to electrical problems by increasing the resistance throughout the individual cells. This can result in the membranes being burned and the entire system failing. Thus, the cells have to be cleaned frequently. However, even when the electrodialysis devices are cleaned regularly a relatively short service life of the membranes results.

Efforts to prevent the generation of the biofilms by using biocidal substances were indeed partially successful; however, they were associated with detrimental effects on the environment, health, properties of the deposition process or the deposited layer.

SUMMARY OF THE INVENTION

The present invention has thus the object to overcome the disadvantages of the conventional methods and devices and to find means by which the biological fouling can be prevented or at least repelled to a large extent.

The object is solved by a membrane electrolysis stack for use in an electrodialysis device, the membrane electrolysis stack comprising membranes stacked on top of each other and respective electrolyte compartments arranged therebetween, at least one first membrane and at least one second membrane alternating in the membrane electrolysis stack, characterized in that at least one first membrane is selected from a group comprising an anion exchange membrane (A) and a bipolar membrane (BP) and in that at least one second membrane is selected from a group comprising a monoselective anion exchange membrane (MSA), a monoselective cation exchange membrane (CSA) and a proton-selective exchange membrane, with the proviso that the at least one first membrane and the at least one second membrane in the membrane electrolysis stack are respectively selected independently of each other and that at least one first membrane in the membrane electrolysis stack is a bipolar membrane (BP);

an electrodialysis device for the regeneration of an electroless plating bath, comprising at least one anode (An) and at least one cathode (Ca) as well as respectively a membrane electrolysis stack arranged between an anode (An) and a cathode (Ca), every membrane electrolysis stack comprising membranes stacked on top of each other and respectively electrolyte compartments arranged therebetween, at least one first membrane and at least one second membrane alternating in each membrane electrolysis stack, characterized in that at least one first membrane is selected from a group comprising an anion exchange membrane (A) and a bipolar membrane (BP) and in that at least one second membrane is selected from a group comprising a monoselective anion exchange membrane (MSA), a monoselective cation exchange membrane (CSA) and a proton-selective exchange membrane, with the proviso that the at least one first membrane and the at least one second membrane in the membrane electrolysis stacks are respectively selected independently of each other and that at least one first membrane in each membrane electrolysis stack is a bipolar membrane (BP), as well as further characterized in that the electrolyte compartments located on the cathode side to the at least one first membrane are diluate compartments (Di1, Di2) in which the electrolyte to be regenerated can be contained, and in that the electrolyte compartments located on the cathode side to the at least one second membrane are concentrate compartments (Co1, Co2, Co3) in which interfering ions taken up from the electrolyte to be regenerated can be contained; and a method for the regeneration of an electroless plating bath, comprising a) providing the bath, b) transporting the bath into at least one diluate compartment (Di1, Di2) of an electrodialysis device having at least one anode (An), at least one cathode (Ca) and at least one membrane electrolysis stack, and c) transferring of interfering ions contained in the bath by electrodialysis from the at least one diluate compartment (Di1, Di2) into at least one concentrate compartment (Co1, Co2, Co3) comprised by the electrodialysis device, characterized in that the method comprises the following further method step:

d) generating of $H_3O+$ ions and of $OH^-$ ions by means of at least one bipolar membrane BP located in the membrane electrolysis stack and transferring the $H_3O+$ ions into the at least one diluate compartment (Di1, Di2) and transferring the $OH^-$ ions into the at least one concentrate compartment (Co1, Co2, Co3).

Insofar as the singular of certain terms is used in the following description and in the claims, for example the singular of the terms "concentrate compartment", "diluate compartment", "anion exchange membrane", "monoselective anion exchange membrane", "monoselective cation exchange membrane", "proton-selective membrane", "bipolar membrane", "membrane electrolysis stack", "anode", "cathode", "first partial electrodialysis device", "second partial electrodialysis device" and "electrolyte compartment", both the singular and alternatively the plural in a corresponding manner are meant at the designated point unless otherwise expressly indicated. The same applies vice versa, i.e. if the plural is mentioned, this can likewise mean both the plural and the singular in a corresponding manner.

Insofar as monoselective anion exchange membranes and monoselective cation exchange membranes are mentioned in the following description and claims, these are ion exchange membranes which almost exclusively allow ions to pass which have a univalent charge, thus univalent anions in the case of the monoselective anion exchange membranes and univalent cations in the case of the monoselective cation exchange membranes. Multivalent ions can not pass through these exchange membranes.

The membrane electrolysis stack(s) according to the invention comprised by the electrodialysis device according to the invention comprise(s) membranes stacked on top of each other and respective electrolyte compartments arranged therebetween, one or more first membranes and one or more second membranes alternating in succession in the membrane electrolysis stack. According to the invention, at least one first membrane is selected from a group comprising an anion exchange membrane and a bipolar membrane, and at least one second membrane is selected from a group comprising a monoselective anion exchange membrane, a monoselective cation exchange and a proton-selective exchange membrane. In this connection, however, the condition applies that the at least one first and at least one second membranes in the membrane electrolysis stacks are respectively selected independently of another, i.e. respectively independently of the membranes of the respective other group and also respectively independently of the membranes of the respective own group. This condition thus indicates that each individual first membrane can respectively be selected arbitrarily from the given first membrane group and that each individual second membrane can respectively be selected arbitrarily from the given second membrane group. Furthermore, the condition applies that at least one of the first membranes in the membrane electrolysis stack is a bipolar membrane.

Accordingly, there is a couple of electrolyte compartments adjacent to each other, wherein these electrolyte compartments are separated from each other by exchange membranes, with at least one first membrane and at least one second membrane alternating between the electrolyte compartments, wherein the at least one first and at least one second membranes are independently of each other selected from the groups as defined herein above and wherein the least one first membrane is a bipolar membrane.

DETAILED DESCRIPTION

Thus, membrane stacks can be formed in which the membranes are stacked on top of each other as follows:

| ... | /C/ | 1. membr. | /D/ | 2. membr. | /C/ | 1. membr. | /D/ | 2. membr. | /C/ | ... |
|---|---|---|---|---|---|---|---|---|---|---|
| | | BP | | MSA | | BP | | MSA | | |
| | | or | | or | | or | | or | | |
| + | | A | | MSC | | A | | MSC | | − |
| | | | | or | | | | or | | |
| | | | | HS | | | | HS | | | wherein

BP: bipolar membrane

MSA: monoselective anion exchange membrane

MSC: monoselective cation exchange membrane

HS: proton-selective exchange membrane

/D/: diluate compartment

/C/: concentrate compartment.

Accordingly, each of the electrolyte compartments being adjacent to each other is either a diluate compartment or a concentrate compartment. The diluate compartments and the concentrate compartments preferably alternate in succession, wherein each one of the exchange membranes separates two adjacent compartments.

The electrolysis stack can consist of only one single pair of electrolysis membranes consisting of a first membrane and a second membrane, or, as indicated in the diagram, two such pairs or also even more such pairs. The latter case is symbolized by the adjacent " . . . " on the left and the right.

A membrane sequence according to the invention wherein each membrane separates two adjacent electrolyte compartments could look as follows, for example:

. . . /C/ BP /D/ MSA /C/ A /D/ MSC /C/ BP /D/ MSA /C/ BP /D/ . . . .

The membrane electrolysis stack according to the invention is used in the electrodialysis device according to the invention. This serves in particular for the regeneration of an electroless metal plating bath, for example an electroless nickel plating bath. The electrodialysis device comprises at least one anode and at least one cathode as well as a respective membrane electrolysis stack according to the invention arranged between an anode and a cathode. Each membrane electrolysis stack comprises membranes stacked on top of each other and respective electrolyte compartments arranged therebetween, one or more first membranes and one or more second membranes alternating in succession in the membrane electrolysis stack. In a manner according to the invention, at least one first membrane is selected from a group comprising an anion exchange membrane and a bipolar membrane, and at least one second membrane is selected from a group comprising a monoselective anion exchange membrane, a monoselective cation exchange membrane and a proton-selective exchange membrane, with the proviso that the at least one first and at least one second membranes in the membrane electrolysis stacks are respectively selected independently of each other and that at least one of the at least one first membrane in each membrane electrolysis stack is a bipolar membrane. Additionally, there are furthermore the diluate compartments located on the cathode side to the at least one first membrane in which the electrolyte to be regenerated is contained. The electrolyte compartments located on the cathode side to the at least one second membrane are concentrate compartments in which interfering ions taken up from the electrolyte to be regenerated are contained.

The above-mentioned sequences of membranes and electrolyte compartments are shown in such a way that an associated anode (+) is located on the left-hand side and an associated cathode (−) is located on the right-hand side:

| + ... | /C/ | 1. membr. | /D/ | 2. membr. | /C/ | 1. membr. | /D/ | 2. membr. | /C/ | ... − |
|---|---|---|---|---|---|---|---|---|---|---|
| | | BP or A | | MSA or MSC or HS | | BP or A | | MSA or MSC or HS | | | wherein additionally "+": anode side, "−": cathode side.

Thus, the sequence according to the above-mentioned example can be as follows.

+ . . . /C/ BP /D/ MSA /C/ A /D/ MSC /C/ BP /D/ MSC /C/ . . . − wherein again "+": anode side, "−": cathode side.

According to that, the membrane electrolysis stack according to the invention is configured with regard to the sequence of the membranes comprised therein in such a way that anions from the diluate compartments pass over into the concentrate compartments (transfer of anions from the diluate compartment via an anion exchange membrane into the concentrate compartment to the left-hand side). The same applies to the carboxylic anions as well as optionally metal ions present in the form of anionic complexes. In the case of an electroless nickel plating electrolyte, for example, hypophosphite, orthophosphite, sulfate, carboxylic anions, hydroxide ions and optionally anionic complex anions of nickel are transferred from a diluate compartment to the left-hand side into a concentrate compartment.

Furthermore, multivalent anions are held back from a transfer from the concentrate compartment into the diluate compartment (prevention of the transfer of multivalent anions into the diluate compartment by using a monoselective anion exchange membrane). In the case of an electroless nickel plating electrolyte, for example, orthophosphite and sulfate anions are retained in the concentrate compartment. In contrast, univalent anions, such as hypophosphite, carboxylic anions, hydroxide ions and optionally present anionic complex ions of nickel, can be transferred from the concentrate compartment into the diluate compartment next to it and thus back into the bath liquid.

Thus, drawing a balance, the recyclable substances (hypophosphite, carboxylic anions, hydroxide ions and optionally present complex anions of the metal) are retained in the diluate compartment while the interfering substances (orthophosphite, sulfate anions) are transferred from the diluate compartment into the concentrate compartment.

The multiply charged cations, for example nickel ions, are retained in the diluate compartment because they can not pass over into the concentrate compartment due to a monoselective cation exchange membrane present on the cathode side. In contrast, the univalent cations, for example sodium ions and protons (hydronium ions: $H_3O^+$), are transferred into the concentrate compartment. The interfering substances (sodium ions) are thus removed from the diluate compartment.

In a preferred embodiment of the invention, at least one of the at least one second membrane in the membrane electrolysis stack is a monoselective anion exchange membrane. The recyclable substances (for example hypophosphite, carboxylic anions, hydroxide ions and optionally complex anions of the metal to be deposited) which were previously transferred into the concentrate compartment are thus selectively transferred back into the diluate compartment.

In another preferred embodiment of the invention, at least one of the at least one second membrane in the membrane electrolysis stack is a monoselective cation exchange membrane. The interfering cations (sodium ions) can thereby selectively be transferred from the diluate compartment into the concentrate compartment while the ions of the metal to be deposited are retained in the diluate compartment.

Alternatively, a proton-selective exchange membrane can also be provided instead of a monoselective cation exchange membrane. This membrane is only permeable to protons. The interfering cations are thus not transferred into the concentrate compartments. This solution is indeed likewise according to the invention as a separation of the interfering anions still results in this case. However, interfering cations are not removed with this embodiment.

By means of the additional inclusion of bipolar membranes in the membrane electrolysis stack according to the invention, namely as a first membrane, hydroxide ions on the anode side and hydronium ions on the cathode side are additionally generated.

Bipolar membranes have already been described for other applications. For example, they are employed in combination with other membranes to demineralize water. Bipolar membranes are offered by ASTOM Corp., JP under the trade name Neosepta, for example.

Such membranes represent a combination of an anion exchange membrane and a cation exchange membrane. These two membranes are provided together as a sandwich. In this combination the anion exchange membrane is arranged on the anode side and the cation exchange membrane is arranged on the cathode side. By introducing such a membrane into an electrodialysis cell, water is decomposed: even very pure water dissociates into hydroxide ions and hydronium ions. These ions are separated within the bipolar membrane by the electrical field. Due to the ion exchange action of this membrane, a back-diffusion is impossible such that an effective separation of these ions takes place under the action of the electrical field: hydroxide ions formed within the membrane are transferred towards the anode and hydronium ions formed within the membrane are transferred towards the cathode. As the bipolar membrane is employed as a first membrane, namely on the anode side to the diluate compartment and on the cathode side to the concentrate compartment, the hydroxide ions are transferred into the concentrate compartment and the hydronium ions are transferred into the diluate compartment. Further material for the generation of these ions is constantly supplied by diffusion of water into the membrane.

By the generation and transfer of hydronium ions into the diluate compartment, the pH is lowered in the latter. Through this, the tendency to biological fouling is significantly repelled or even completely prevented as the microorganisms responsible for it can no longer exist under these conditions. This is all the more important as the pH in the bath liquid is gradually increased by the regeneration in the electrodialysis device according to the invention. This is because hydroxide ions are also transferred during the regeneration from the concentrate compartments via optionally present monoselective anion exchange membranes into the diluate compartments.

The pH could indeed also be lowered by addition of acid to the bath liquid present in the diluate compartments to prevent or at least reduce biological fouling. However, further interfering ions would be added through this, namely the counter-anions to the hydronium ions providing for the pH reduction. This, however, would require an additional removal of these interfering ions and reduce the efficiency of the existing device. Additionally, the excess acid in the bath would again have to be neutralized.

The hydroxide ions injected from a bipolar membrane into the concentrate compartment serve to increase the pH of the concentrate liquid present therein. This would slowly be decreased without the generation of hydroxide ions by means of the bipolar membranes as hydronium ions are constantly transferred from the diluate compartment through the monoselective cation exchangers into the concentrate compartment. Through the additional generation of hydroxide ions by means of the bipolar membranes, the pH of the concentrate liquid could be kept largely constant and the otherwise required addition of hydroxide ions to the concentrate could be reduced.

In spite of the relatively high pH, formation of microorganisms in the concentrate compartments has not to be feared as the substances required for their formation, for example carboxylic anions, in these electrolyte compartments are not present in the concentration required for it. It is thus not required for the concentrate compartments that the pH is in these electrolyte compartments also lowered to a pH counteracting biological fouling. With regard to reasons relating to process technology (removal of multivalent orthophosphite ions), this would indeed not be practical.

The pH of the bath liquid present in the at least one diluate compartment is preferably maintained at no more than 4, very particularly preferably at no more than 3. The pH of the bath liquid is preferably not less than 1.0. The pH can be about 2.5, for example.

Furthermore, the pH of the concentrate liquid present in the at least one concentrate compartment is maintained at a value of at least 7, very particularly preferably at least 8. The pH is preferably no more than 9.5. The pH can be about 7.5, for example.

The method according to the invention which serves for the regeneration of an electroless metal plating bath, for example an electroless nickel plating bath, thus comprises the following method steps:
   a) providing the bath,
   b) transporting the bath into at least one diluate compartment of an electrodialysis device having at least one anode, at least one cathode and at least one membrane electrolysis stack, and
   c) transferring of interfering ions contained in the bath by electrodialysis from the at least one diluate compartment into at least one concentrate compartment comprised by the electrodialysis device.

In a manner according to the invention, the method comprises the following further method step:
   d) generating of $H_3O^+$ ions and of $OH^-$ ions by means of at least one bipolar membrane located in the membrane electrolysis stack and injecting the $H_3O^+$ ions into the at least one diluate compartment and injecting the $OH^-$ ions into the at least one concentrate compartment.

Initially, the bath is typically located in a treatment container in which the parts to be metallized are contained. For the regeneration, the bath liquid is transported from there into the electrodialysis device, namely into the diluate compartments of this device. After performing the regeneration, the bath liquid is transported back from the electrodialysis device into the treatment container.

The concentrate liquid contained in the concentrate compartment(s) is gradually enriched with the interfering substances and its volume is increased by the hydrate envelopes transported together with the latter due to process reasons. Furthermore, an increase in volume also takes place through the water of the base added in diluted form. This solution is thus either replaced again and again or else diluted. The concentrate liquid waste forming in the course of this is disposed of.

If the membrane electrolysis stack of the electrodialysis device only has one single diluate compartment and one single concentrate compartment, the bath liquid is transported into this single diluate compartment. A diluate compartment and a concentrate compartment in combination with the membrane separating these and one membrane adjoined on each outer thereof form a pair of cells. In a corresponding manner, however, several diluate compartments and several concentrate compartments, i.e. several pairs of cells, can also be present in the membrane electrolysis stack. To provide several such compartments is advantageous to increase the exchange area over the membranes and thus to achieve a faster and more efficient effect of the electrodialysis device. To this end, all the diluate compartments are hydraulically connected with each other. The diluate compartments are preferably hydraulically connected in parallel in such a way that the bath liquid is transported from one treatment container or otherwise constructed retaining means for the holding of the bath liquid into the diluate compartments and from there back into the treatment container or the retaining means, respectively. Thus, a diluate circuit results. All the concentrate compartments are likewise hydraulically connected with each other and preferably hydraulically connected in parallel. Thus, a concentrate circuit results. Ultimately, there is in principle no difference between an electrodialysis device having only one single diluate compartment and only one single concentrate compartment and an electrodialysis device having a plurality of diluate compartments and a plurality of concentrate compartments. A difference can only result insofar as the exchange area between the diluate compartments and the concentrate compartments via the at least one first and at least one second membranes is different. If an electrodialysis device having only one single diluate compartment and one single concentrate compartment with a very large membrane exchange area is constructed, the effect of this electrodialysis device is largely identical with that of an electrodialysis device which in fact has a plurality of diluate and concentrate compartments, the membrane exchange area of which, however, is identical to that of the electrodialysis device mentioned at first.

In a preferred embodiment of the invention, an anode-compartment cation exchange membrane is additionally located between each membrane electrolysis stack and the respective anode and a cathode-compartment cation exchange membrane is located between each membrane electrolysis stack and the respective cathode. Furthermore, an anode compartment is located between the anode-compartment cation exchange membrane and the anode and a cathode compartment is located between the cathode-compartment cation exchange membrane and the cathode. The anode and cathode are thus shielded from the liquids present in the diluate and concentrate compartments. For example, the metal ions to be deposited must not enter the electrolyte compartment with which the cathode is in contact as otherwise this metal would deposit on the cathode and destroy the latter. To prevent that undesired reactions take place at the electrodes (anode, cathode), an alkaline solution, for example an NaOH solution, is present in the cathode compartment and an acid solution, for example a $H_2SO_4$ solution, is present in the anode compartment. The anode and cathode compartments may also be connected hydraulically whereby the forming hydroxide and hydronium ions are neutralized to water. In this case, an inert salt solution is present in the electrode compartments, e.g. a 3% sodium sulfate solution.

In another preferred embodiment of the invention, a separate concentrate container is additionally present through which the concentrate liquid present in the concentrate compartments and containing the interfering ions is directed.

Furthermore, according to another preferred embodiment of the invention, a separate diluate container is additionally present through which the liquid present in the diluate compartments is directed.

The membrane electrolysis stack used for the removal of the interfering substances from the bath liquid preferably includes not only the membranes required for the removal of the interfering ions but also the bipolar membranes. In this case, a single stack is formed in which the separating membranes and the bipolar membranes and further the anodes and the cathodes are arranged. In this embodiment of the invention, the decomposition of water to hydroxide ions and hydronium ions thus takes place within the electrodialysis device in which the regeneration of the bath liquid is performed as well. This device therefore comprises at least one anode, at least one cathode and respectively one membrane electrolysis stack, each membrane electrolysis stack having both at least one bipolar membrane and the membranes required for the removal of the interfering ions.

In an embodiment of the invention alternative to this, at least one membrane electrolysis stack and respectively at least one anode and at least one cathode assigned to the stack(s) form a first partial electrodialysis device in which the interfering substances are separated from the recyclable substances. Furthermore, at least one further membrane electrolysis stack and respectively at least one anode and at least one cathode assigned to the stack(s) form a second partial electrodialysis device in which bipolar membranes are located and the hydroxide ions and hydronium ions are thus injected into the electrolyte compartments. In this embodiment, the diluate compartments of the first and second partial electrodialysis devices are in any case hydraulically connected with each other and the concentrate compartments of the first and second partial electrodialysis devices are likewise hydraulically connected with each other. In this case, every first membrane in the first partial electrodialysis device is an anion exchange membrane and every first membrane in the second partial electrodialysis device is a bipolar membrane. In this alternative embodiment, the decomposition of water to hydroxide ions and hydronium ions thus takes place outside of the first partial electrodialysis device in which the regeneration of the bath liquid is performed, namely in the second partial electrodialysis device.

In this embodiment, the first partial electrodialysis device and the second partial electrodialysis device can be arranged separated from each other, for example, i.e. they are not mechanically connected with each other but form respective stacks separated from each other. However, the first and second partial electrodialysis devices do not have to be arranged separated from each other. They can also be accommodated in a common stack. It is only essential that the second of the two partial electrodialysis devices is equipped with bipolar membranes in a manner according to the invention and that the first partial electrodialysis device includes no or only a few bipolar membranes but the membranes required for the regeneration of the bath liquid instead of these. The first of the two electrodialysis devices does not have to include any bipolar membranes as it only serves to effect a removal of the interfering ions from the bath liquid. To this end, it includes anion exchange membranes as a first membrane in any case.

In a first variant of this embodiment, the diluate compartments and the concentrate compartments of the two partial electrodialysis devices can respectively be hydraulically connected in parallel. In this first variant, the bath liquid is simultaneously directed through the diluate compartments of the first and second partial electrodialysis devices and the concentrate liquid present in the concentrate compartments and containing the interfering ions is simultaneously directed through the concentrate compartments of the first and second partial electrodialysis devices. Alternatively, in a second variant, the diluate compartments and the concentrate compartments of the two electrodialysis devices can respectively be hydraulically connected in series. In this second variant, the bath liquid is initially transported into the diluate compartments of the first partial electrodialysis device, then into the diluate compartment(s) of the second partial electrodialysis device and from there back into the diluate compartment(s) of the first partial electrodialysis device. In this case, concentrate liquid from the concentrate compartment(s) of the first partial electrodialysis device can furthermore be transported into the concentrate compartment(s) of the second partial electrodialysis device and from there back into the concentrate compartments of the first partial electrodialysis device.

In this variant of the invention, two stacks—the first and second partial electrodialysis devices—are thus formed, the first partial electrodialysis device serving for the removal of the interfering ions from the bath liquid and the second partial electrodialysis device serving for the generation of hydroxide and hydronium ions by including bipolar membranes in this second partial electrodialysis device. Through the fact that the diluate compartments of the first and second partial electrodialysis devices are hydraulically connected with each other and the concentrate compartments of the first and second partial electrodialysis devices are likewise hydraulically connected with each other, the hydroxide and hydronium ions formed by means of the bipolar membranes enter the bath liquid which also flows through the diluate compartments of the first partial electrodialysis device, or enter the concentrate liquid which also flows through the concentrate compartments of the first partial electrodialysis device and increase the pH in the concentrate liquid or decrease the pH in the bath liquid, respectively.

The variant with two partial electrodialysis devices has the advantage of a separate controllability such that the pH in the diluate can be controlled independently of the operational state of the stack for the bath regeneration. A separate controllability requires an additional rectifier for this second partial electrodialysis device or at least a separate controller which is electrically connected with the existing rectifier.

If one anion exchange membrane or a plurality of anion exchange membranes in a membrane stack of a first partial electrodialysis device not including any bipolar membranes would be replaced at least in part by one or more bipolar membranes, a sequence of membranes would be obtained which corresponds to the sequence according to the invention suitable for water decomposition. In this way, a smooth transition from an exclusively regenerating (first) partial electrodialysis device to a (second) partial electrodialysis device which exclusively decomposes water and lowers the pH in the diluate can be produced. By replacing the membranes, the regeneration capacity of the device is reduced. In a corresponding manner, however, the acid and base production capacity is increased.

In the variant comprising a first and a second partial electrodialysis device, a separate concentrate container can furthermore additionally be present. In this case, the concentrate compartment(s) of the second partial electrodialysis device are connected with the separate concentrate container.

Furthermore, a separate diluate container can additionally be present in this variant. In this case, the diluate compartment(s) of the second partial electrodialysis device are connected with the separate diluate container.

When using a separate diluate container and/or a separate concentrate container, the bath liquid can further be transported from the diluate compartments of the second partial electrodialysis device via the separate diluate container into the diluate compartments of the first partial electrodialysis device and the concentrate liquid can be transported from the concentrate compartments of the second partial electrodialysis device via the separate concentrate container into the concentrate compartments of the first partial electrodialysis device.

The electrodialysis device or the respective partial electrodialysis devices can respectively consist of a single membrane electrolysis stack having an anode arranged on a first side and a cathode arranged on a second side. Alternatively, the electrodialysis device or the respective partial electrodialysis devices can also consist of several membrane electrolysis stacks and thereby form a complete stack, an anode being arranged on a first side of the complete stack and a cathode being arranged on a second side of the complete stack or vice versa. In this case, further electrodes are additionally located between the membrane electrolysis stacks, the electrodes respectively acting as an anode with regard to an adjoined membrane electrolysis stack and as a cathode with regard to the other adjoined membrane electrolysis stack.

The anodes and cathodes of the electrodialysis device according to the invention are connected with a power source/direct current source.

To achieve a transport of the diluate and concentrate liquids, inlets and outlets as well as pumps are provided. Furthermore, filters can be provided to protect the cells from contaminations.

For the design of an electrodialysis device according to the present invention, the charge balance in the complete device has to be taken into consideration. In this connection, a degree of efficiency of the bipolar membranes of almost 100% can be applied. As the charge balance is shifted by using the bipolar membranes, an equivalent amount of cations or anions have to be transported on the concentrate side into or out of the device, respectively, and cations and anions correspondingly have to be transported on the diluate side into or out of the device.

The figures explained in the following serve to illustrate the invention in more detail:

In the figures, the same reference numbers serve to illustrate similar elements.

Figure 1:
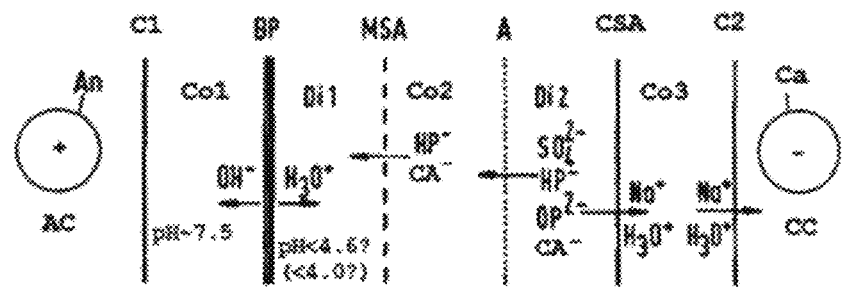
FIG. 1 depicts a schematic illustration of an electrodialysis device in a first embodiment according to the invention.

FIG. 1 schematically depicts an electrodialysis device in a first embodiment according to the invention. The electrodialysis device serves for the regeneration of an electroless nickel plating bath containing $NiSO_4$, sodium hypophosphite, organic carboxylic acids, sodium orthophosphite formed by oxidation from sodium hypophosphite, sulfate anions additionally formed by replenishing $NiSO_4$ and hydroxide ions additionally formed by adjusting the pH with NaOH.

The electrodialysis device comprises two electrodes, namely an anode An and a cathode Ca. Membranes stacked with respect to each other and electrolyte compartments therebetween are located between the two electrodes An, Ca. The anode An is in contact with an anode compartment AC. The anode compartment AC contains an anolyte which is an acidic or conductive neutral solution, for example a 0.2 to 1 mol $H_2SO_4$ solution or a 0.2 mol $Na_2SO_4$ solution. The anode compartment AC is limited on the cathode side by a cation exchange membrane C1. On the cathode side to the cation exchange membrane C1 of the anode compartment An, the following electrolyte compartments and membranes are adjoined in the order given in the following: concentrate compartment Co1, bipolar membrane BP, diluate compartment Di1, monoselective anion exchange membrane MSA, concentrate compartment Co2, anion exchange membrane A, diluate compartment Di2, monoselective cation exchange membrane CSA, concentrate compartment Co3, cation exchange membrane C2, the bipolar membrane BP and the anion exchange membrane A respectively being first membranes and the monoselective anion exchange membrane MSA and the monoselective cation exchange membrane GSA being second membranes. On the cathode side, the cathode compartment CC in which the cathode Ca is located is adjoined to the cation exchange membrane C2. The cathode compartment CC contains a catholyte which is an alkaline solution, for example a 1 mol NaOH solution. AC and CG can also be hydraulically connected with each other and contain a largely neutral salt solution, e.g. a 0.2 mol $Na_2SO_4$ solution.

The diluate compartments Di1, Di2 are hydraulically connected in parallel. Furthermore, the diluate compartments Di1, Di2 are jointly connected with a container which comprises the bath liquid. The aqueous bath liquid is weakly acidic (pH<4.0) and contains nickel ions, sodium ions, $H_3O^+$ ions, hypophosphite anions, orthophosphite anions formed by oxidation from hypophosphite anions, sulfate ions and carboxylic anions.

The concentrate compartments Co1, Co2, Co3 are likewise hydraulically connected in parallel. To this end, the concentrate compartments Co1, Co2, Co3 are jointly connected with each other in a circuit. An aqueous concentrate liquid flows continuously through the concentrate compartments Co1, Co2, Co3. The concentrate liquid is neutral to weakly acidic (pH=7.5) and contains orthophosphite anions, carboxylic anions, sulfate anions, hydroxide ions and sodium ions which already got into the liquid by transfer.

The transfer of ions is likewise indicated in FIG. 1:

Hypophosphite ($HP^-$), orthophosphite ($OP^{2-}$), $SO_4^{2-}$ and carboxylic ($CA^-$) anions pass from the diluate compartment Di2 through the anion exchange membrane A into the concentrate compartment Co2. Only the univalent anions, namely the hypophosphite ($HP^-$) and carboxylic ($CA^-$) anions, pass from the concentrate compartment Co2 into the diluate compartment Di1 adjoined on the anode side.

Furthermore, only the $Na^+$ and $H_3O^+$ ions pass by transfer from the diluate compartment Di2 through the monoselective cation exchange membrane CSA into the concentrate compartment Co3 adjoined on the cathode side while the $Ni^{2+}$ ions can not pass through this membrane and thus remain in the diluate compartment Di2. The $Na^+$ and hydronium ions further pass by transfer through the cation exchange membrane C2 into the cathode compartment CC.

By the hydraulic parallel connection of the concentrate compartments on the one hand and the diluate compartments on the other hand, the compositions of the liquids in the individual compartments are respectively homogenized.

$OH^-$ ions are transported through the bipolar membrane BP into the concentrate compartment Co1 adjoined on the anode side to the bipolar membrane BP. By the injection of $OH^-$ ions into the concentrate compartment Co1 and thus into all the concentrate compartments Co1, Co2, Co3 due to the hydraulic parallel connection, the reduction of the pH in these electrolyte compartments is counteracted. However, as the concentration of substances promoting the formation of microorganisms, for example carboxylic anions, is relatively low in these electrolyte compartments, the risk of biological fouling does not exist despite the relatively high pH.

At the same time, $H_3O^+$ ions are transported into the diluate compartment Di1 adjoined on the cathode side to the bipolar membrane BP. Through this, the pH is lowered in this diluate compartment Di1 and thus in all the diluate compartment Di1, Di2 due to the hydraulic parallel connection. This leads to microorganisms not being able to adhere in the diluate compartments Di1, Di2 and in all the adjoined inlets and outlets. The pH is preferably maintained within a range below 4.

Figure 2:
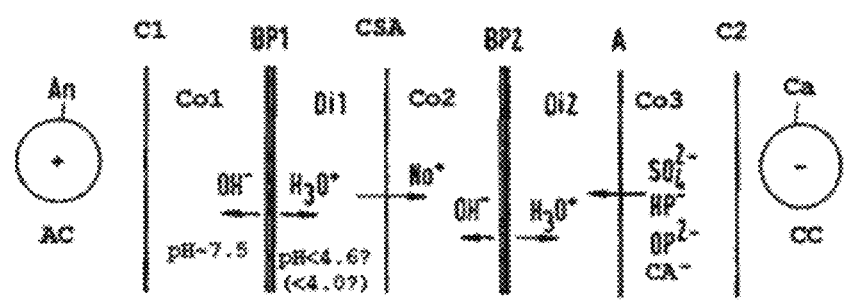
FIG. 2 depicts a schematic illustration of a second partial electrodialysis device of an electrodialysis device in a second embodiment according to the invention.

FIG. 2 schematically depicts a second partial electrodialysis device belonging to an electrodialysis device of a second embodiment according to the invention.

Figure 3:
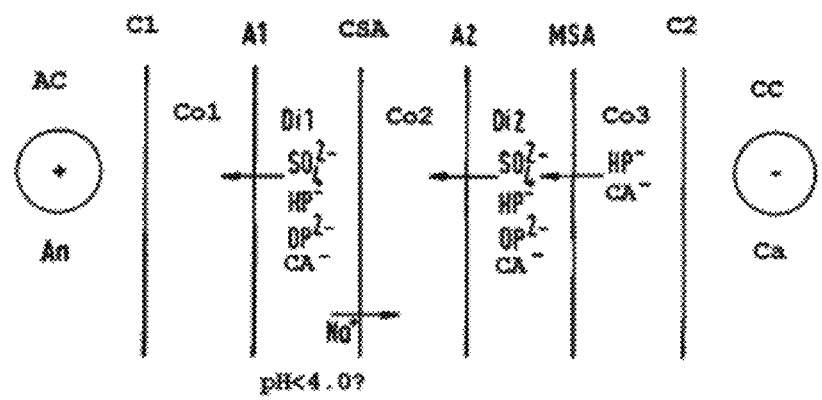
FIG. 3 depicts a schematic illustration of a first partial electrolysis device forming in combination with the second partial electrodialysis device of FIG. 2 an electrodialysis device according to the second embodiment according to the invention.

In this case, there is a first partial electrodialysis device related to this second partial electrodialysis device which together form an electrodialysis device. The first partial electrodialysis device is depicted in FIG. 3 and is explained below.

In the same manner as in the case of FIG. 1, the electrodialysis device consisting of the first and second partial electrodialysis devices serves for the regeneration of an electroless nickel plating bath. While the first partial electrodialysis device serves for the regeneration of the nickel plating bath, hydronium ions are injected in the second partial electrodialysis device into the diluate compartments Di1, Di2 to effectively prevent the formation of microorganisms in the diluate compartments Di1, Di2 of this partial electrodialysis device, in the inlets and outlets adjoined thereto as well as in the diluate compartments of the first partial electrodialysis device. Additionally, hydroxide ions are injected into the concentrate compartments Co1, Co2. Through this, a reduction of the pH in the concentrate compartments Co1, Co2, Co3, in the inlets and outlets as well as in the concentrate compartments of the first partial electrodialysis device is counteracted.

The second partial electrodialysis device has an anode An located in an anode compartment AC. An anolyte is contained in the anode compartment which can have the same composition as the anolyte of FIG. 1. The anode compartment AC is limited on the cathode side by a cation exchange membrane C1. On the cathode side to the cation exchange membrane C1 of the anode compartment AC, the following electrolyte compartments and membranes are adjoined in the order given in the following: concentrate compartment Co1, bipolar membrane BP1, diluate compartment Di1, monoselective cation exchange membrane CSA, concentrate compartment Co2, bipolar membrane BP2, diluate compartment Di2, anion exchange membrane A, concentrate compartment Co3, the bipolar membranes BP1, BP2 being first membranes and the monoselective cation exchange membrane CSA being a second membrane. Additionally, an anion exchange membrane A is provided instead of a further second membrane which would be selected according to the invention from the group comprising monoselective cation exchange membrane, monoselective anion exchange membrane and proton-selective ion exchange membrane. Instead of the anion exchange membrane A, a monoselective anion exchange membrane can also be employed at this point, for example. The concentrate compartment Co3 is limited on the cathode side by a cation exchange membrane C2. On the cathode side, the cathode compartment CC in which the catholyte and the cathode Ca are located is adjoined to the cation exchange membrane C2. In the case of the electrodialysis device of FIG. 1, the catholyte can be a salt solution and can hydraulically communicate with the anolyte.

The diluate compartments Di1, Di2 are hydraulically parallel to each other and also hydraulically connected in parallel with the corresponding diluate compartments of the first partial electrodialysis device. Furthermore, the diluate compartments Di1, Di2 are jointly connected with a container which comprises the bath liquid. The aqueous bath liquid is weakly acidic (pH<4.0) and contains nickel ions, sodium ions, $H_3O^+$ ions, hypophosphite anions, orthophosphite anions formed by oxidation from hypophosphite anions, sulfate ions and carboxylic anions.

The concentrate compartments Co1, Co2, Co3 are likewise hydraulically connected parallel to each other and also hydraulically connected in parallel with the corresponding concentrate compartments of the first partial electrodialysis device. To this end, the concentrate compartments Co1, Co2, Co3 are jointly connected with each other in a circuit. An aqueous concentrate liquid flows continuously through the concentrate compartments Co1, Co2, Co3. The concentrate liquid is neutral to weakly acidic (pH≈7.5) and contains orthophosphite anions, carboxylic anions, sulfate anions, hydroxide ions and sodium ions which already got into the liquid by transfer.

The transfer of ions is likewise indicated in FIG. 2:

Hypophosphite (HP$^-$), orthophosphite (OP$^{2-}$), SO$_4^{2-}$ and carboxylic (CA$^-$) anions pass from the concentrate compartment Co3 through the anion exchange membrane A into the diluate compartment Di2. If a monoselective anion exchange membrane would be employed at this point instead of the anion exchange membrane A, orthophosphite (OP$^{2-}$) and SO$_4^{2-}$ anions could not be transferred from the concentrate compartment Co3 back into the diluate compartment Di2. Through this, the separation efficiency of the electrodialysis device would be increased as the already performed transfer of these anions from the diluate compartments Di1, Di2 of the first electrodialysis stack (FIG. 3) into the concentrate compartments Co1, Co2 would not be partially reversed again. The univalent cations, namely Na$^+$ ions, pass from the diluate compartment Di1 into the concentrate compartment Co2 adjoined on the cathode side, while the Ni$^{2+}$ ions can not pass this membrane and thus remain in the diluate compartment Di1.

By the hydraulic parallel connection of the concentrate compartments on the one hand and the diluate compartments on the other hand, the compositions of the liquids in the individual compartments are homogenized among one another.

OH$^-$ ions are injected through the bipolar membranes BP1, BP2 into the concentrate compartments Co1, Co2 adjoined on the anode side to these membranes BP1, BP2. By the injection of OH$^-$ ions into the concentrate compartments Co1, Co2 and thus into all the concentrate compartments Co1, Co2, Co3 due to the hydraulic parallel connection, the reduction of the pH in these electrolyte compartments is counteracted. However, as the concentration of substances promoting the formation of microorganisms, for example carboxylic anions, is relatively low in these electrolyte compartments, the risk of biological fouling does not exist despite the relatively high pH.

At the same time, H$_3$O$^+$ ions are injected into the diluate compartments Di1, Di2 adjoined on the cathode side to the bipolar membranes BP1, BP2. Through this, the pH of the diluate is lowered in these diluate compartments Di1, Di2. This leads to microorganisms not being able to adhere in the diluate compartments Di1, Di2 and in all the adjoined inlets and outlets and also in the diluate compartments of the first partial electrodialysis device. The pH is preferably maintained within a range below 4.

FIG. 3 schematically depicts a first partial electrodialysis device forming in combination with the second partial electrodialysis device of FIG. 2 an electrodialysis device according to the second embodiment of the invention.

While the second partial electrodialysis device of FIG. 2 serves for the injection of hydronium ions into the diluate compartments and of hydroxide ions into the concentrate compartments, the bath liquid in the first partial electrodialysis device is regenerated.

The first partial electrodialysis device has an anode An located in an anode compartment AC. An anolyte is contained in the anode compartment which can have the same composition as the anolyte of FIGS. 1, 2. The anode compartment AC is limited on the cathode side by a cation exchange membrane C1. On the cathode side to the cation exchange membrane C1 of the anode compartment AC, the following electrolyte compartments and membranes are adjoined in the order given in the following: concentrate compartment Co1, anion exchange membrane A1, diluate compartment Di1, monoselective cation exchange membrane CSA, concentrate compartment Co2, anion exchange membrane A2, diluate compartment Di2, monoselective anion exchange membrane MSA, concentrate compartment Co3, the anion exchange membranes A1, A2 being first membranes and the monoselective cation exchange membrane CSA and the monoselective anion exchange membrane MSA being second membranes. The concentrate compartment Co3 is limited on the cathode side by a cation exchange membrane C2. On the cathode side, the cathode compartment CC in which the catholyte and the cathode Ca are located is adjoined to the cation exchange membrane C2. As in the case of the electrodialysis device of FIGS. 1, 2, the catholyte can be an alkaline solution.

The diluate compartments Di1, Di2 are connected hydraulically parallel to each other and also hydraulically connected in parallel with the corresponding diluate compartments of the second partial electrodialysis device. Furthermore, the diluate compartments Di1, Di2 are jointly connected with a container which comprises the bath liquid. The aqueous bath liquid is weakly acidic (pH<4.0) and contains nickel ions, sodium ions, H$_3$O$^+$ ions, hypophosphite anions, orthophosphite anions formed by oxidation from hypophosphite anions, sulfate ions and carboxylic anions.

The concentrate compartments Co1, Co2, Co3 are likewise hydraulically parallel to each other and also hydraulically connected in parallel with the corresponding concentrate compartments of the second partial electrodialysis device. To this end, the concentrate compartments Co1, Co2, Co3 are jointly connected with each other in a circuit. An aqueous concentrate liquid flows continuously through the concentrate compartments Co1, Co2, Co3. The concentrate liquid is neutral to weakly acidic (pH 7.5) and contains orthophosphite anions, carboxylic anions, sulfate anions, hydroxide ions and sodium ions which already got into the liquid by transfer.

The transfer of ions is likewise indicated in FIG. 3:

Only hypophosphite (HP$^-$) and carboxylic anions (CA$^-$) pass from the concentrate compartment Co3 through the monoselective anion exchange membrane MSA into the concentrate compartment Co2. All the anions, namely the SO$_4^{2-}$, orthophosphite, hypophosphite and carboxylic anions pass from the diluate compartment Di2 into the concentrate compartment Co2 situated on the anode side thereto by passing through the anion exchange membrane A2. The same process also takes place during the transfer from the diluate compartment Di1 via the anion exchange membrane A1 to the concentrate compartment Co1 situated on the anode side thereto. The univalent cations, namely Na$^+$ ions, are transferred from the diluate compartment Di1 into the concentrate compartment Co2 adjoined on the cathode side, while the Ni$^{2+}$ ions can not pass the monoselective cation exchange membrane CSA and thus remain in the diluate compartment Di1.

By the hydraulic parallel connection of the concentrate compartments on the one hand and the diluate compartments on the other hand, the compositions of the liquids in the individual compartments are respectively homogenized among one another.

As the diluate compartments Di1, Di2 of the first partial electrodialysis device (FIG. 3) and the diluate compartments Di1, Di2 of the second partial electrodialysis device (FIG. 2) are hydraulically connected in parallel, the composition of the diluates contained therein is homogenized. In the same manner, the composition of the concentrate liquid contained in the concentrate compartments Co1, Co2, Co3 of the first partial electrodialysis device (FIG. 3) and the concentrate compartments Co1, Co2, Co3 of the second partial electrodialysis device (FIG. 2) is homogenized as these are likewise hydraulically connected in parallel.

Figure 4:
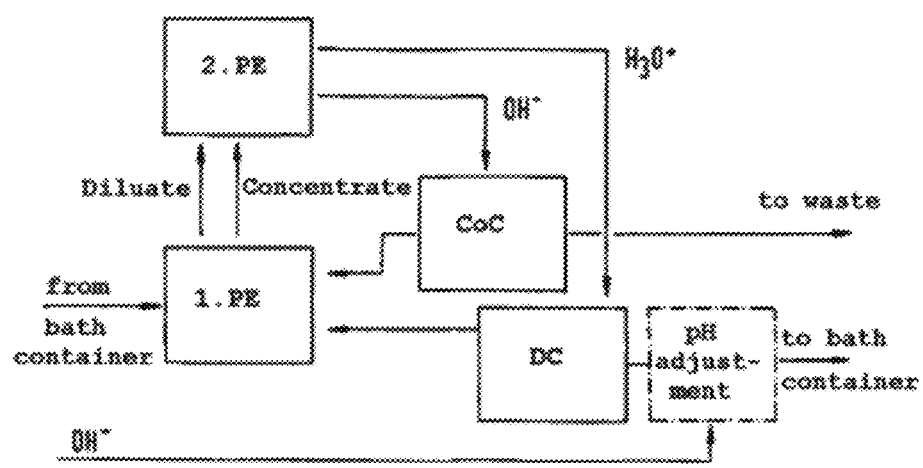
FIG. 4 depicts a schematic illustration of an electrodialysis device having a first partial electrodialysis device and a second partial electrodialysis device.

A schematic illustration of an electrodialysis device is depicted in FIG. 4 which comprises a first partial electrodialysis device 1.PE and a second partial electrodialysis device 2.PE. The details of the first and second partial electrodialysis devices 1.PE, 2.PE are depicted in FIGS. 2, 3 and have been described.

Bath liquid is transported from a bath container into the diluate compartments of the first partial electrodialysis device 1.PE. The regeneration of the bath liquid takes place therein. At the same time, a concentrate liquid is contained in the concentrate compartments of the first partial electrodialysis device 1.PE. The diluate liquid which originates from the bath liquid and the concentrate liquid are transported into the corresponding electrolyte compartments of the second partial electrodialysis device 2.PE. There, hydroxide ions are injected into the concentrate liquid and hydronium ions are injected into the diluate liquid such that the pH of the concentrate liquid is increased or kept constant and the pH of the diluate liquid is lowered. After passing through the second partial electrodialysis device 2.PE, the respective liquids are transported into a concentrate container CoC or a diluate container DC. These liquids pass from there again into the corresponding concentrate or diluate compartments of the first partial electrodialysis device 1.PE such that a total of two circuits results, namely a concentrate circuit and a diluate circuit. A part of the diluate liquid is also recycled from the diluate container DC back into the bath container. This liquid is a regenerated bath liquid. Alkali can additionally be metered into the diluate container for a fine adjustment of the pH.

The invention claimed is:

1. An electrodialysis device for the regeneration of an electroless plating bath, comprising at least one anode and at least one cathode,
   at least one first partial electrodialysis device, said at least one first partial electrodialysis device arranged between said at least one anode and said at least one cathode, said at least one first partial electrodialysis device including a membrane electrolysis stack, said membrane electrolysis stack comprising a plurality of membranes and electrolyte compartments arranged between the membranes, said plurality of membranes including at least one first membrane and at least one second membrane with first membranes and second membranes alternating in succession in the membrane electrolysis stack, at least one of the first membranes being an anion exchange membrane, and said first membranes otherwise being selected from the group consisting of anion exchange membranes and bipolar membranes, and every second membrane being selected from the group consisting of monoselective anion exchange membranes, monoselective cation exchange membranes, and proton-selective exchange membranes, each first membrane and the second membrane immediately succeeding each first membrane in the membrane electrolysis stack being selected independently of each other,
   at least one second partial electrodialysis device, said at least one second partial electrodialysis device arranged between said at least one anode and said at least one cathode, said at least one second partial electrodialysis device including a membrane electrolysis stack, said membrane electrolysis stack comprising a plurality of membranes and electrolyte compartments arranged between the membranes, said plurality of membranes including at least one first membrane and at least one second membrane with first membranes and second membranes alternating in succession in the membrane electrolysis stack, at least one of the first membranes being a bipolar membrane, and first membranes otherwise being selected from the group consisting of anion exchange membranes and bipolar membranes, and every second membrane being selected from the group consisting of monoselective anion exchange membranes, monoselective cation exchange membranes, and proton-selective exchange membranes, each first membrane and the second membrane immediately succeeding each first membrane in the membrane electrolysis stack being selected independently of each other,
   said first and said second partial electrodialysis devices each including electrolyte diluate compartments located on the cathode side to the at least one first membranes, said diluate compartments being adapted to contain the electrolyte to be regenerated, and electrolyte concentrate compartments located on the cathode side to the at least one second membranes, the concentrate compartments being adapted to contain a concentrate liquid,
   wherein the concentrate compartments are adapted to receive concentrate liquid containing interfering ions taken up from the electrolyte to be regenerated,
   wherein the diluate compartments of said first partial electrodialysis device are hydraulically connected to the dilute compartments of second partial electrodialysis devices, and
   wherein the concentrate compartments of said first partial electrodialysis device are hydraulically connected to the concentrate compartments of second partial electrodialysis devices.

2. The electrodialysis device according to claim 1, wherein an anode-compartment cation exchange membrane is additionally located between each membrane electrolysis stack and the respective anode and a cathode-compartment cation exchange membrane is located between each membrane electrolysis stack and the respective cathode and wherein an anode compartment is located between the anode-compartment cation exchange membrane and the anode and a cathode compartment is located between the cathode-compartment cation exchange membrane and the cathode.

3. The electrodialysis device according to claim 1, wherein at least one second membrane in each of the membrane electrolysis stacks is a monoselective anion exchange membrane.

4. The electrodialysis device according to claim 1, wherein at least one second membrane in each of the membrane electrolysis stacks is a monoselective cation exchange membrane.

5. The electrodialysis device according to claim 1, wherein a separate concentrate container is additionally present through which concentrate liquid present in the concentrate compartments and containing the interfering ions is directed.

6. The electrodialysis device according to claim 1, wherein a separate diluate container is additionally present through which liquid present in the diluate compartments is directed.

7. The electrodialysis device according to claim 1, wherein a separate concentrate container is additionally present and the concentrate compartment(s) of the second partial electrodialysis device is (are) connected with the separate concentrate container.

8. The electrodialysis device according to claim 1, wherein a separate diluate container is additionally present and wherein the diluate compartment(s) of the second partial electrodialysis device is (are) connected with the separate diluate container.

9. A method for the regeneration of an electroless plating bath, comprising:
  a) providing the bath which is to be regenerated,
  b) transporting the bath into at least one diluate compartment of an electrodialysis device, wherein the electrodialysis device comprises:
    at least one anode and at least one cathode,
    at least one first partial electrodialysis device, said at least one first partial electrodialysis device arranged between said at least one anode and said at least one cathode, said at least one first partial electrodialysis device including a membrane electrolysis stack, said membrane electrolysis stack comprising a plurality of membranes and electrolyte compartments arranged between the membranes, said plurality of membranes including at least one first membrane and at least one second membrane with first membranes and second membranes alternating in succession in the membrane electrolysis stack, at least one of the first membranes being an anion exchange membrane, and said first membranes otherwise being selected from the group consisting of anion exchange membranes and bipolar membranes, and every second membrane being selected from the group consisting of monoselective anion exchange membranes, monoselective cation exchange membranes, and proton-selective exchange membranes, each first membrane and the second membrane immediately succeeding each first membrane in the membrane electrolysis stack being selected independently of each other,
    at least one second partial electrodialysis device, said at least one second partial electrodialysis device arranged between said at least one anode and said at least one cathode, said at least one second partial electrodialysis device including a membrane electrolysis stack, said membrane electrolysis stack comprising a plurality of membranes and electrolyte compartments arranged between the membranes, said plurality of membranes including at least one first membrane and at least one second membrane with first membranes and second membranes alternating in succession in the membrane electrolysis stack, at least one of the first membranes being a bipolar membrane, and first membranes otherwise being selected from the group consisting of anion exchange membranes and bipolar membranes, and every second membrane being selected from the group consisting of monoselective anion exchange membranes, monoselective cation exchange membranes, and proton-selective exchange membranes, each first membrane and the second membrane immediately succeeding each first membrane in the membrane electrolysis stack being selected independently of each other,
    said first and said second partial electrodialysis devices each including electrolyte diluate compartments located on the cathode side to the at least one first membranes, said diluate compartments being adapted to contain the electrolyte to be regenerated, and electrolyte concentrate compartments located on the cathode side to the at least one second membranes, the concentrate compartments being adapted to contain a concentrate liquid,
    wherein the concentrate compartments are adapted to receive concentrate liquid containing interfering ions taken up from the electrolyte to be regenerated,
    wherein the diluate compartments of said first partial electrodialysis device are hydraulically connected to the dilute compartments of second partial electrodialysis devices, and
    wherein the concentrate compartments of said first partial electrodialysis device are hydraulically connected to the concentrate compartments of second partial electrodialysis devices;
  c) transferring of interfering ions contained in the bath by electrodialysis from the at least one diluate compartment into at least one concentrate compartment, and
  d) generating of $H_3O^+$ ions and of $OH^-$ ions by means of at least one bipolar membrane located in the membrane electrolysis stack of said second partial electrodialysis device and transferring the $H_3O^+$ ions into the at least one diluate compartment and transferring the $OH^-$ ions into the at least one concentrate compartment.

10. The method according to claim 9, wherein the electroless plating bath is an electroless nickel plating bath.

11. The method according to claim 10, wherein the pH of the bath to be regenerated comprised by the at least one diluate compartment is maintained at no more than 4.

12. The method according to claim 10, wherein the pH of the bath to be regenerated comprised by the at least one diluate compartment is maintained at no more than 3.

13. The method according to claim 10, wherein the pH of the concentrate liquid contained in the at least one concentrate compartment is maintained at a value of at least 7.

14. The method according to claim 9, wherein the bath to be regenerated is transported from the diluate compartment(s) of the second partial electrodialysis device via a separate diluate container into the diluate compartment(s) of the first partial electrodialysis device and wherein the concentrate liquid is transported from the concentrate compartment(s) of the second partial electrodialysis device via a separate concentrate container into the concentrate compartment(s) of the first partial electrodialysis device.

15. An electrodialysis device for the regeneration of an electroless plating bath, the device comprising,
    at least one first partial electrodialysis device, said at least one first partial electrodialysis device arranged between at least one first anode and at least one first cathode, said at least one first partial electrodialysis device including a membrane electrolysis stack, said membrane electrolysis stack comprising a plurality of membranes and electrolyte compartments arranged between the membranes, said plurality of membranes including at least one first membrane and at least one second membrane with first membranes and second membranes alternating in succession in the membrane electrolysis stack, at least one of the first membranes being an anion exchange membrane, and said first membranes otherwise being selected from the group consisting of anion exchange membranes and bipolar membranes, and every second membrane being selected from the group consisting of monoselective anion exchange membranes, monoselective cation exchange membranes, and proton-selective exchange membranes, each first membrane and the second membrane immediately succeeding each first membrane in the membrane electrolysis stack being selected independently of each other, at least one second partial electrodialysis device, said at least one second partial electrodialysis device arranged between at least one second anode and at least one second cathode, said at least one second partial electrodialysis device including a membrane electrolysis stack, said membrane electrolysis stack comprising a plurality of membranes and electrolyte compartments arranged between the membranes, said plurality of membranes including at least one first membrane and at least one second membrane with first membranes and second membranes alternating in succession in the membrane electrolysis stack, at least one of the first membranes being a bipolar membrane, and first membranes otherwise being selected from the group consisting of anion exchange membranes and bipolar membranes, and every second membrane being selected from the group consisting of monoselective anion exchange membranes, monoselective cation exchange membranes, and proton-selective exchange membranes, each first membrane and the second membrane immediately succeeding each first membrane in the membrane electrolysis stack being selected independently of each other, said first and said second partial electrodialysis devices each including electrolyte diluate compartments located on the cathode side to the at least one first membranes, said diluate compartments being adapted to contain the electrolyte to be regenerated, and electrolyte concentrate compartments located on the cathode side to the at least one second membranes, the concentrate compartments being adapted to contain a concentrate liquid, wherein the concentrate compartments are adapted to receive concentrate liquid containing interfering ions taken up from the electrolyte to be regenerated, wherein the diluate compartments of said first partial electrodialysis device are hydraulically connected to the dilute compartments of second partial electrodialysis devices, and wherein the concentrate compartments of said first partial electrodialysis device are hydraulically connected to the concentrate compartments of second partial electrodialysis devices.

16. The electrodialysis device according to claim 15, wherein an anode-compartment cation exchange membrane is additionally located between each membrane electrolysis stack and the respective anode and a cathode-compartment cation exchange membrane is located between each membrane electrolysis stack and the respective cathode and wherein an anode compartment is located between the anode-compartment cation exchange membrane and the anode and a cathode compartment is located between the cathode-compartment cation exchange membrane and the cathode.

17. The electrodialysis device according to claim 15, wherein at least one second membrane in each of the membrane electrolysis stacks is a monoselective anion exchange membrane.

18. The electrodialysis device according to claim 15, wherein at least one second membrane in each of the membrane electrolysis stacks is a monoselective cation exchange membrane.

19. The electrodialysis device according to claim 15, wherein a separate concentrate container is additionally present through which concentrate liquid present in the concentrate compartments and containing the interfering ions is directed.

20. The electrodialysis device according to claim 15, wherein a separate diluate container is additionally present through which liquid present in the diluate compartments is directed.

21. The electrodialysis device according to claim 15, wherein a separate concentrate container is additionally present and the concentrate compartment(s) of the second partial electrodialysis device is (are) connected with the separate concentrate container.

22. The electrodialysis device according to claim 15, wherein a separate diluate container is additionally present and wherein the diluate compartment(s) of the second partial electrodialysis device is (are) connected with the separate diluate container.

23. A method for the regeneration of an electroless plating bath, comprising:
  a) providing the bath which is to be regenerated,
  b) transporting the bath into at least one diluate compartment of an electrodialysis device, wherein the electrodialysis device comprises:
    at least one first partial electrodialysis device, said at least one first partial electrodialysis device arranged between at least first one anode and at least one first cathode, said at least one first partial electrodialysis device including a membrane electrolysis stack, said membrane electrolysis stack comprising a plurality of membranes and electrolyte compartments arranged between the membranes, said plurality of membranes including at least one first membrane and at least one second membrane with first membranes and second membranes alternating in succession in the membrane electrolysis stack, at least one of the first membranes being an anion exchange membrane, and said first membranes otherwise being selected from the group consisting of anion exchange membranes and bipolar membranes, and every second membrane being selected from the group consisting of monoselective anion exchange membranes, monoselective cation exchange membranes, and proton-selective exchange membranes, each first membrane and the second membrane immediately succeeding each first membrane in the membrane electrolysis stack being selected independently of each other,
    at least one second partial electrodialysis device, said at least one second partial electrodialysis device arranged between at least one second anode and at least one second cathode, said at least one second partial electrodialysis device including a membrane electrolysis stack, said membrane electrolysis stack comprising a plurality of membranes and electrolyte compartments arranged between the membranes, said plurality of membranes including at least one first membrane and at least one second membrane with first membranes and second membranes alternating in succession in the membrane electrolysis stack, at least one of the first membranes being a bipolar membrane, and first membranes otherwise being selected from the group consisting of anion exchange membranes and bipolar membranes, and every second membrane being selected from the group consisting of monoselective anion exchange membranes, monoselective cation exchange membranes, and proton-selective exchange membranes, each first membrane and the second membrane immediately succeeding each first membrane in the membrane electrolysis stack being selected independently of each other, said first and said second partial electrodialysis devices each including electrolyte diluate compartments located on the cathode side to the at least one first membranes, said diluate compartments being adapted to contain the electrolyte to be regenerated, and electrolyte concentrate compartments located on the cathode side to the at least one second membranes, the concentrate compartments being adapted to contain a concentrate liquid, wherein the concentrate compartments are adapted to receive concentrate liquid containing interfering ions taken up from the electrolyte to be regenerated, wherein the diluate compartments of said first partial electrodialysis device are hydraulically connected to the dilute compartments of second partial electrodialysis devices, and wherein the concentrate compartments of said first partial electrodialysis device are hydraulically connected to the concentrate compartments of second partial electrodialysis devices;

c) transferring of interfering ions contained in the bath by electrodialysis from the at least one diluate compartment into at least one concentrate compartment, and d) generating of $H_3O^+$ ions and of $OH^-$ ions by means of at least one bipolar membrane located in the membrane electrolysis stack of said second partial electrodialysis device and transferring the $H_3O^+$ ions into the at least one diluate compartment and transferring the $OH^-$ ions into the at least one concentrate compartment.

24. The method according to claim 23, wherein the electroless plating bath is an electroless nickel plating bath.

25. The method according to claim 24, wherein the pH of the bath to be regenerated comprised by the at least one diluate compartment is maintained at no more than 4.

26. The method according to claim 24, wherein the pH of the bath to be regenerated comprised by the at least one diluate compartment is maintained at no more than 3.

27. The method according to claim 24, wherein the pH of the concentrate liquid contained in the at least one concentrate compartment is maintained at a value of at least 7.

28. The method according to claim 23, wherein the bath to be regenerated is transported from the diluate compartment(s) of the second partial electrodialysis device via a separate diluate container into the diluate compartment(s) of the first partial electrodialysis device and wherein the concentrate liquid is transported from the concentrate compartment(s) of the second partial electrodialysis device via a separate concentrate container into the concentrate compartment(s) of the first partial electrodialysis device.

* * * * *